Dec. 25, 1934.　　G. M. KRIEGBAUM ET AL　　1,985,374
PLANTER
Filed Jan. 24, 1933　　3 Sheets-Sheet 3

Inventors
George M. Kriegbaum
Clarence C. Haas
By

Patented Dec. 25, 1934

1,985,374

UNITED STATES PATENT OFFICE 1,985,374

PLANTER

George M. Kriegbaum and Clarence C. Haas, Richmond, Ind., assignors to International Harvester Company, a corporation of New Jersey Application January 24, 1933, Serial No. 653,294

11 Claims. (Cl. 97—236)

This invention relates to planters. More particularly it relates to a planter construction utilizing a front truck and means for adjusting the furrow opening means of the planter with respect to the supporting wheels and the front truck.

In planting implements of the type to which this invention relates, a two-wheel frame is used in the conventional construction; the furrow openers, seed hoppers, and depositing mechanism all being supported forwardly of the transverse axis of the wheels on the frame. The tongue is also connected to the frame. The combined weight of the various units mounted on the frame transmits a considerable neck yoke weight to the front end of the draft tongue. When attachments, such as fertilizer distributors, and pea and bean seed attachments, are added to the planter, the neck yoke weight is considerably increased.

Another difficulty encountered with the conventional planters, as described, is that the accuracy of the planting depth is affected by variations in the height of the outer end of the tongue, variations being due to the hitched height and to the rise and fall during travel of the implement. This action results in the seed being deposited at varied depths.

In avoiding these difficulties forecarriages or wheel trucks have been provided for the front of the main planter frame, the tongue being pivoted on a transverse axis. This prevents the proper seating of the furrow openers from being influenced by the angularity of the draft tongue. In making vertical adjustments of the furrow openers when a draft tongue is utilized, care must be taken to provide for substantially parallel movement through the working range of the furrow openers. Any substantial swinging of the furrow openers about a transverse axis is objectionable, particularly in check row planting, as such angular movement destroys the relative position of the button on the check wire and the location of the seed in the furrow.

It is the main object of this invention to provide improved structure for obtaining this desired adjustment movement of the furrow openers, and it is obtained in the present device by a system of links working in combination with the supporting frames to obtain a substantially rectilinear movement of the furrow openers through the working depth in the soil, as hereinafter described.

Figure 1:
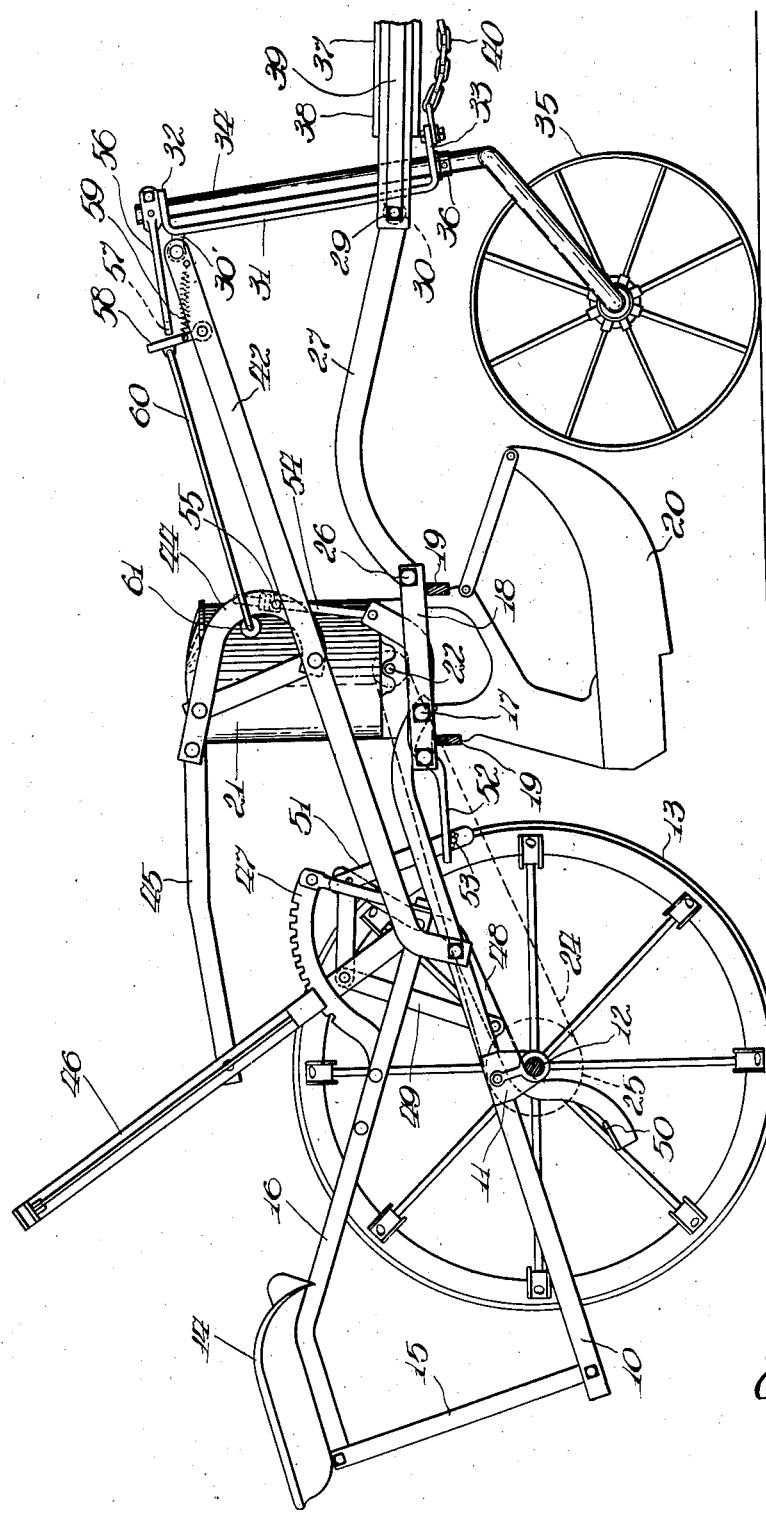
Figure 1 is a side elevation of a planter incorporating a preferred embodiment of the invention, one wheel being broken away with the axle in section to better show the construction. In this figure the furrow opener is shown lifted out of operative position.
Figure 2:
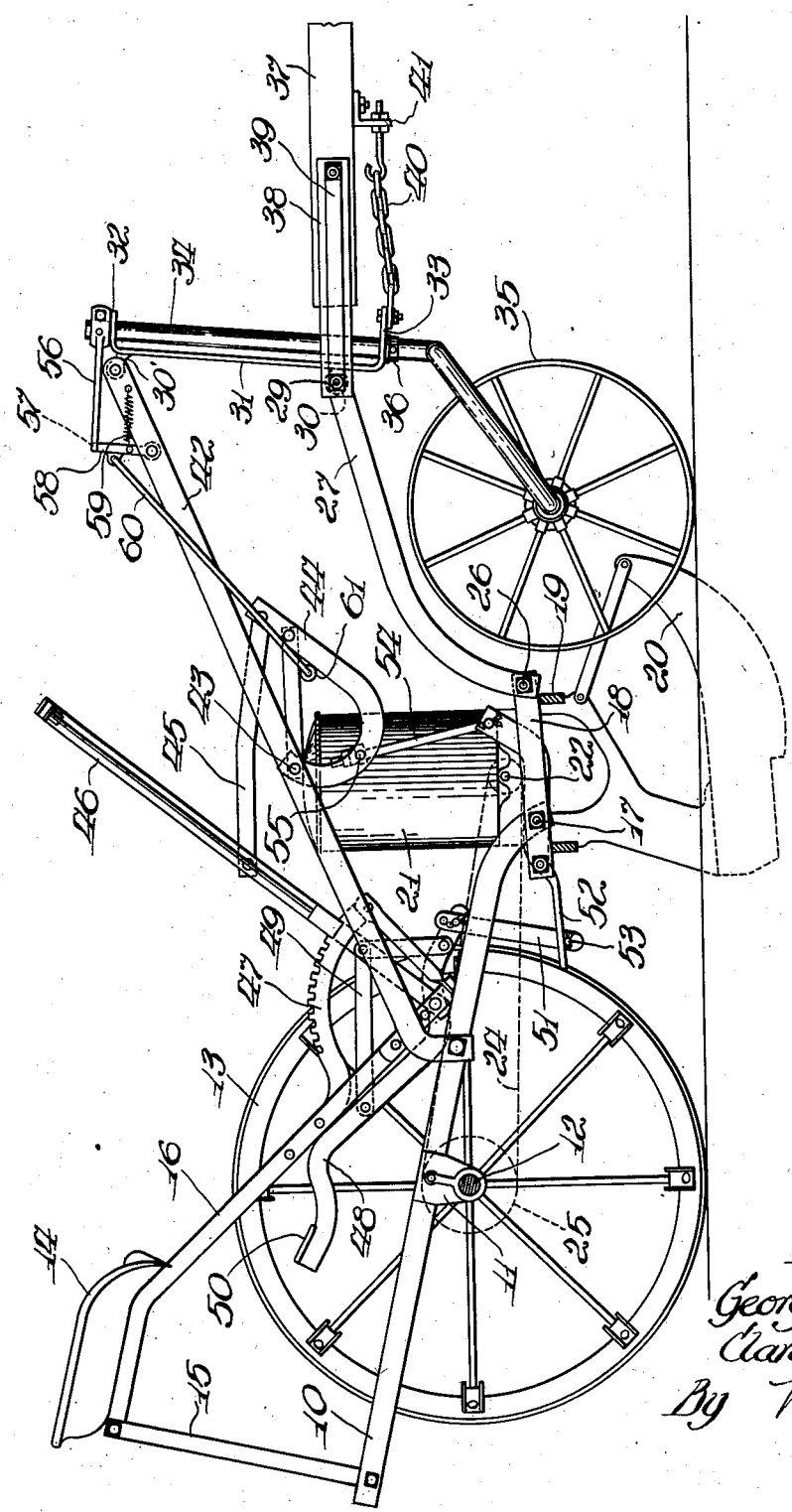
Figure 2 is a view similar to Figure 1, with the furrow opener in operative ground engaging position.
Figure 3:
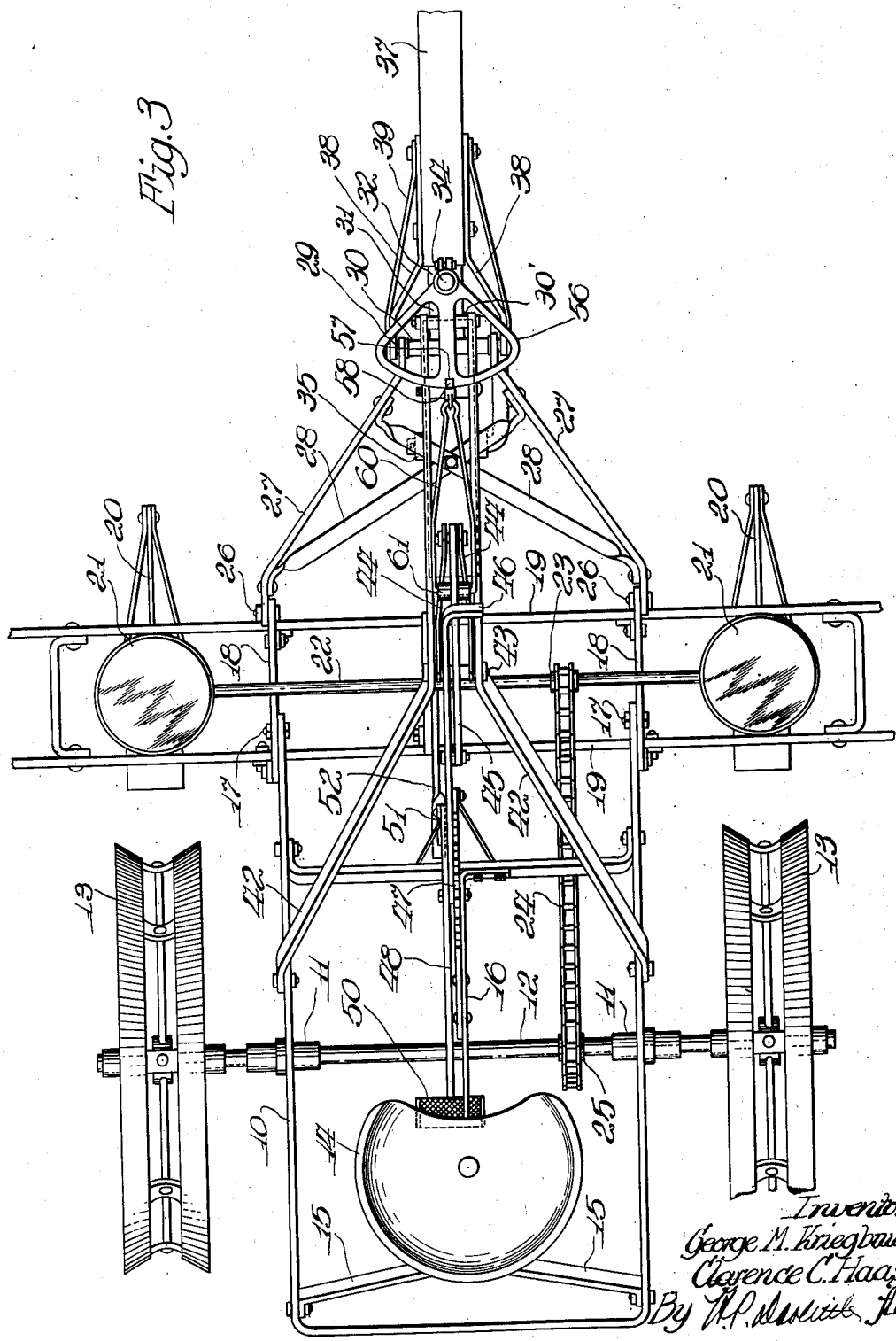
Figure 3 is a plan view of the same planter shown in Figures 1 and 2.

The main portion of the planter illustrated is of a conventional construction. The main frame 10, which consists of transversely and longitudinally arranged bars secured together, is pivotally mounted by brackets 11 on an axle shaft 12. Said shaft is rotatable in the brackets, and the wheels 13 are non-rotatably secured to the axle for transmitting power to the seed dispensing mechanisms. An operator's seat 14 is mounted above the frame on supporting bars 15 and 16.

The longitudinal side bars of the main frame are pivotally connected at their forward ends by bolts 17 with bars 18 which, together with the cross bars 19 to which they are rigidly secured, form an auxiliary frame on which the furrow openers 20 and the seed dispensing mechanisms are mounted. As this construction is all conventional and well known in the art, only such parts have been shown as are necessary to illustrate the present invention. Seed cans 21 are shown and a transverse shaft 22 is illustrated, which are a part of the seed dispensing mechanism ordinarily used in planters of this type. A chain sprocket 23 secured to the shaft 22, is connected by a chain 24 to an aligned chain sprocket 25 secured to the axle shaft 12.

The bars 18 of the auxiliary frame extend forwardly thereof and are pivotally connected by bolts 26 to the side bars 27 of a connecting structure which joins the auxiliary frame with the draft tongue and tongue truck, as will be hereinafter described. Diagonal brace bars 28 connect the side bars 27 and form what might be considered the third frame of this construction.

The forward ends of the side bars 27 are provided with transversely aligned openings through which a pin 29 extends. Said pin also extends through a supporting bracket 30 which is rigidly secured to a truck or caster wheel supporting member 31. Said member extends in an upward direction and is provided with forwardly directed portions 32 and 33. Said portions are formed with aligned openings through which the shaft 34 of a wheel support extends. As illustrated, said wheel support is of a conventional caster construction, carrying a wheel 35 on a cranked portion of its downwardly and rearwardly extending lower end. It is understood, of course, that any type of truck or caster wheel construction could be utilized. A thrust collar 36 positioned on the shaft 34, abuts the lower side of the portion 33 on the support 31, carrying the load at that point. The shaft 34 is freely rotatable with respect to the supporting member 31.

The draft tongue 37 is pivotally secured by bars 38 and 39 to the ends of the pin 29, previously referred to. By this construction the draft tongue may have up-and-down movement without transmitting such movement to any part of the planter. Lateral movement of the tongue is transmitted directly to the main frame of the planter and the tongue truck is carried around by such movement. A stay chain 40 is secured to the forward extension 33 of the truck supporting member and to a bracket 41 secured to the tongue.

A pair of bars 42, which form part of the depth adjusting means of the planter, are pivotally connected on the side bars of the main planter frame near the axle a short distance forwardly thereof. Said bars extend upwardly and inwardly to a point substantially over the auxiliary frame where they are secured together by a tie bolt 43. Said tie bolt also forms a pivot for a link structure 44 which consists of two spaced members. Said members have a curved portion for a purpose to be hereinafter described, which terminate in rearwardly directed portions. Said last named portions are connected by a link 45 with a conventional hand adjusting lever 46. Said lever is pivoted on the seat supporting bar 16, and a notch rack 47 is provided for locking the lever in a plurality of adjusting positions. To assist the operator in actuating the lever 46 a rearwardly and downwardly extending bar 48, pivoted on the same axis as the lever 46, is connected by a bar 49 with said lever. The rear portion of the bar 48 extends over the axle shaft 12 and is provided with a foot pedal 50 within reach of the operator. Weight applied to the bar 48 assists the operator in tilting the main frame of the planter for lifting the furrow openers, as will be hereinafter explained. The forward portion of the bar 48 is connected by a link 51 pivoted thereto on a transverse axis with a lifting member 52 secured to the auxiliary frame and extending rearwardly therefrom. As illustrated, the link 51 extends through an opening in the member 52 and is provided with a transverse pin 53 beneath the member to provide for exerting upward pressure against said member. The weight of the furrow opener is normally sufficient to force it into the ground the distance permitted by the adjustment of the lever. Conventional spring pressure means may be utilized for this purpose if found desirable.

The same member which provides the rearward extension 52 on the auxiliary frame, extends forwardly and upwardly to provide means for connecting a lifting link 54. Said link is adjustably threaded through a trunnion block 55. The trunnions of said block are pivoted in aligned openings in the structure 44 which, as previously described, consists of two spaced members.

The forward ends of the bars 42 are pivotally connected on a transverse axis to a supporting bracket 30' rigidly secured to the upper end of the member 31.

To provide means for locking the front supporting wheel against castering during operation of the planter in a straight line travel, a latch is provided. A sector 56 is rigidly secured to the top end of the shaft 34. A notch 57 is formed in the center of said sector. A latch bar 58 pivoted on a transverse axis on the forward ends of the bars 42, is positioned to engage said notch. A spring 59 is connected to the latch bar and to a forward point on one of the bars 42 to hold the latch resiliently against the sector 56. A hairpin yoke 60 extends through an apertured lug on the latch bar 58 and rearwardly and downwardly toward the lifting structure 44. The ends of the yoke are turned in to rotatably hold a roller 61. Said roller runs on the circular portion of the structure 44 as a cam. When the lever 46 is operated to lift the planter from operative position the latch bar 58 is withdrawn from engagement with the notch 57, allowing the supporting wheel to freely caster for turning the planter at the ends of the row.

Consideration of the pivot points of the main frame on the auxiliary or furrow opener supporting frame, the pivots of the third frame with the auxiliary frame and with the front wheel support, the pivots of the bars 42 on the main frame and the support for the front wheel, and the various links connected thereto, will show that a substantially parallel lift arrangement has been provided. Throughout the entire range of lift, both with the furrow opener in the soil and above, a substantial rectilinear movement is obtained by the linkage provided. The movement is very free and a wide range of lift is obtained. The improved and novel construction of the linkage illustrated and described, gives a light weight planter which has all the desirable properties of adjustment and operation.

Assuming that the planter is in lifted position, as shown in Figure 1, the action of the lowering mechanism can be briefly described by direct reference to the various members and links making up the mechanism. The latch on the lever 46 is released by the operator and said lever is moved forwardly. By this movement the link 45 is moved forwardly, thereby rotating the structure 44 about its pivot on the tie bolt 43. The lifting link 54 is lowered by said rotation of the structure 44. At the same time the rear link 51 is lowered as the bar 48, to which it is pivotally connected, is rotated by operation of the lever 46. The lengths of the various links are so proportioned and their pivot points are so located that a substantial rectilinear movement is obtained in the movement of the auxiliary frame. The main frame 10 pivots forwardly during the lowering operation and the forward frame, which connects the tongue truck with the auxiliary frame, pivots downwardly at its rear end. The lifting operation is substantially the same, being brought about by pulling the lever 46 rearwardly. The weight of the operator is applied to the pedal 50 to assist in the operation.

As previously described, the latch 58 engages the notch 57 in the sector 56 and holds the caster wheel against pivoting movement when the planter is in ground engaging position. As shown in Figure 1, when the furrow openers are lifted, the curved portion of the structure 44 operates as a cam on the roller 61 to draw the latch 58 out of engaging position, whereby the supporting wheel is free to caster for turning at the ends of the field.

It is to be understood that applicants have shown and described only a preferred embodiment of their improved planter construction and that they claim as their invention all adjustable constructions falling within the scope of the appended claims.

What is claimed is:

1. A field implement comprising two wheel supported frames, an implement frame positioned between said frames and pivotally connected thereto on transverse longitudinally spaced axes, and a lifting linkage adjustably connected to the wheel supported frames and operable to tilt the adjacent portions of said frames substantially the same vertical distance, whereby the implement frame is given a substantially rectilinear movement.

2. A field implement comprising a main frame pivotally supported on a transverse axis, a tongue truck, a lifting linkage support connecting the main frame and the tongue truck, an implement frame hinged to the main frame and floatingly hinged to the tongue truck, and a lifting linkage mounted on the support and connected to the implement frame at longitudinally spaced points whereby said linkage is operable to lift the implement frame with a substantially rectilinear movement.

3. A field implement comprising a main frame pivotally supported on a transverse axis, a castering tongue truck, a lifting linkage support connecting the main frame and the tongue truck, an implement frame hinged to the main frame and to the tongue truck, a lifting linkage connecting the main frame, the support and the implement frame, said linkage being operable to lift the implement frame with a substantially rectilinear movement, and locking means connected to the lifting linkage and to the tongue truck operable to lock the truck against castering movement when the implement frame is lowered.

4. A field implement comprising a tiltable wheel supported main frame, an auxiliary frame hinged to the front of the main frame by means having two spaced transverse axes whereby the auxiliary frame is floatingly supported, implements mounted on said frame, a tongue truck hinged to the auxiliary frame, and a lifting linkage connected to each of the frames and to the tongue truck, said linkage including substantially parallel links connected to longitudinally spaced points on the auxiliary frame whereby said linkage is operable to lift the auxiliary frame with a substantially rectilinear movement.

5. A planter comprising a wheel supported main frame, an auxiliary frame hinged to the front of the main frame, furrow opening means mounted on said auxiliary frame, a tongue truck hinged to the forward portion of the auxiliary frame, lifting means connected to the main frame and to the tongue truck, two spaced lifting members connected to the auxiliary frame, and a linkage operable to simultaneously raise said members substantially the same distance whereby the auxiliary frame is lifted with a substantially rectilinear movement.

6. A planter comprising a wheel supported main frame, an auxiliary frame hinged to the front of the main frame, furrow opening means mounted on said auxiliary frame, a tongue truck hinged to the forward portion of the auxiliary frame, lifting means connected to the main frame and to the tongue truck, two longitudinally spaced vertically extending lifting members connected to the auxiliary frame, and a linkage operable to simultaneously raise said members substantially the same distance whereby the auxiliary frame is lifted with a substantially rectilinear movement.

7. A planter comprising a wheel supported main frame, an implement frame hinged to the front of the main frame, furrow opening means mounted on said implement frame, a castering tongue truck hinged to the forward portion of the implement frame, lifting means connected to the main frame, the tongue truck and the implement frame, and means associated with said lifting means operable to lock the tongue truck against castering movement when the furrow opening means are lowered into operative position.

8. A planter comprising a tiltable wheel supported main frame, an implement frame hinged to the front of the main frame, furrow opening means mounted on said implement frame, a castering tongue truck hinged to the forward portion of the implement frame by means having two spaced transverse axes whereby the auxiliary frame is floatingly supported between the tiltable main frame and the tongue truck, lifting means connected to the main frame, the tongue truck and the implement frame, and means associated with said lifting means operable to lock the tongue truck against castering movement when the furrow opening means are lowered into operative position.

9. A planter comprising a wheel supported main frame, an auxiliary frame hinged to the front of the main frame, furrow opening means mounted on the auxiliary frame, a tongue truck frame hinged to the auxiliary frame and extending forwardly therefrom, a rolling support for said frame, a lifting bar pivotally connected with respect to the truck frame and the main frame, a lifting member pivotally secured to the lifting bar above the auxiliary frame, lifting linkage pivotally attached to the lifting member and adjustable with respect to the main frame, and means for connecting the auxiliary frame to said lifting means for fore and aft positions, said lifting means being operative to lift the auxiliary frame with a substantially rectilinear movement.

10. A planter comprising a wheel supported main frame, an auxiliary frame hinged to the front of the main frame, furrow opening means mounted on the auxiliary frame, a tongue truck frame hinged to the auxiliary frame and extending forwardly therefrom, a castering wheel support for said frame, a lifting bar pivotally connected with respect to the truck frame and the main frame, a lifting member pivotally secured to the lifting bar above the auxiliary frame, and lifting linkage pivotally attached to the lifting member and adjustable with respect to the main frame, means for connecting the auxiliary frame to said lifting means at fore and aft positions, said lifting means being operative to lift the auxiliary frame with a substantially rectilinear movement, and locking means connecting the castering wheel support and the lifting linkage, said means being operable to lock the wheel support against castering when the furrow opening means are lowered into operative position.

11. A planter comprising a wheel supported main frame, an auxiliary frame hinged to the front of said frame, furrow opening and seed dispensing means mounted on the auxiliary frame, a tongue truck frame hinged to the auxiliary frame and extending forwardly upwardly therefrom, a tongue hinged to said frame, a caster wheel support pivotally secured to said frame and extending upwardly therefrom, a caster wheel carried by said support, a lifting frame hinged to the upper end of said support and to the main frame at a point rearwardly of its connection with the auxiliary frame, a lifting member pivotally secured to the lifting frame above the auxiliary frame and extending forwardly and upwardly therefrom, a lifting linkage pivotally attached to the lifting member and secured to the auxiliary frame, said linkage being provided with means for positively lifting the auxiliary frame upwardly, an adjusting lever pivotally mounted on the main frame and provided with means for securing it in a plurality of angular positions, and a lifting link pivotally secured to said lever and to the lifting member.

GEORGE M. KRIEGBAUM.
CLARENCE C. HAAS.